United States Patent
Slattery et al.

(10) Patent No.: US 7,669,750 B2
(45) Date of Patent: *Mar. 2, 2010

(54) METHOD FOR FORMING A PREFORM FOR A STRUCTURAL ASSEMBLY

(75) Inventors: Kevin T. Slattery, St. Charles, MO (US); Keith A. Young, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/168,343

(22) Filed: Jul. 7, 2008

(65) Prior Publication Data

US 2008/0276566 A1 Nov. 13, 2008

Related U.S. Application Data

(62) Division of application No. 10/737,873, filed on Dec. 16, 2003, now Pat. No. 7,398,911.

(51) Int. Cl.
*B23K 20/12* (2006.01)

(52) U.S. Cl. .................. 228/112.1; 228/114.5

(58) Field of Classification Search ........... None
See application file for complete search history.

(56) References Cited

U.S. PATENT DOCUMENTS

| | | | |
|---|---|---|---|
| 2,395,723 A | 2/1946 | Chmielewski | |
| 3,699,639 A | 10/1972 | Ditto et al. | |
| 4,657,626 A | 4/1987 | Cearlock et al. | |
| 4,667,501 A | 5/1987 | Martin | |
| 5,248,077 A | 9/1993 | Rhoades et al. | |
| 5,298,098 A * | 3/1994 | Hoedl | 156/73.1 |
| 5,302,414 A | 4/1994 | Alkhimov et al. | |
| 5,460,317 A | 10/1995 | Thomas et al. | |
| 5,469,617 A | 11/1995 | Thomas et al. | |
| 5,486,262 A | 1/1996 | Searle | |
| 5,518,562 A | 5/1996 | Searle et al. | |
| 5,682,677 A | 11/1997 | Mahoney | |
| 5,697,544 A | 12/1997 | Wykes | |
| 5,718,366 A | 2/1998 | Colligan | |

(Continued)

FOREIGN PATENT DOCUMENTS

EP   1 048 390 A2   11/2000

(Continued)

OTHER PUBLICATIONS

The Welding Institute; *Leading Edge Friction Hydro Pillar Processing*, Connect; Jun. 1992.

(Continued)

*Primary Examiner*—Kiley Stoner
(74) *Attorney, Agent, or Firm*—Alston & Bird LLP

(57) ABSTRACT

A preform and method for forming a structural assembly are provided. The preform can be formed by friction welding structural members to a base member and subsequently providing a connection material to join the structural members. The resulting preform can be formed with dimensions and a configuration that approximate the dimensions and configuration of the structural assembly. Thus, the structural assembly can be formed by joining multiple members that are generally smaller than the finished assembly.

13 Claims, 5 Drawing Sheets

U.S. PATENT DOCUMENTS

| | | | |
|---|---|---|---|
| 5,718,863 A | 2/1998 | McHugh et al. | |
| 5,769,306 A | 6/1998 | Colligan | |
| 5,794,835 A | 8/1998 | Colligan et al. | |
| 5,865,364 A | 2/1999 | Trask et al. | |
| 5,971,247 A | 10/1999 | Gentry | |
| 5,975,406 A | 11/1999 | Mahoney et al. | |
| 6,045,028 A | 4/2000 | Martin et al. | |
| 6,050,474 A | 4/2000 | Aota et al. | |
| 6,051,325 A | 4/2000 | Talwar et al. | |
| 6,068,178 A | 5/2000 | Michisaka | |
| 6,070,784 A | 6/2000 | Holt et al. | |
| 6,095,402 A | 8/2000 | Brownell et al. | |
| 6,106,233 A | 8/2000 | Walker et al. | |
| 6,168,066 B1 | 1/2001 | Arbegast | |
| 6,173,880 B1 | 1/2001 | Ding et al. | |
| 6,216,765 B1 | 4/2001 | Tseng et al. | |
| 6,227,433 B1 | 5/2001 | Waldron et al. | |
| 6,257,309 B1 | 7/2001 | Kinane et al. | |
| 6,311,889 B1 | 11/2001 | Ezumi et al. | |
| 6,470,558 B1 | 10/2002 | Russell et al. | |
| 6,516,992 B1 | 2/2003 | Colligan | |
| 6,554,177 B2 * | 4/2003 | Foster et al. | 228/112.1 |
| 6,742,697 B2 | 6/2004 | McTernan et al. | |
| 6,779,708 B2 | 8/2004 | Slattery | |
| 6,910,616 B2 | 6/2005 | Halley et al. | |
| 7,398,911 B2 * | 7/2008 | Slattery et al. | 228/112.1 |
| 2001/0038028 A1 | 11/2001 | Iwashita | |
| 2002/0066768 A1 * | 6/2002 | Foster et al. | 228/112.1 |
| 2002/0125297 A1 | 9/2002 | Stol et al. | |
| 2002/0168466 A1 | 11/2002 | Tapphorn et al. | |
| 2003/0168494 A1 | 9/2003 | Halley et al. | |
| 2003/0192941 A1 * | 10/2003 | Ishida et al. | 228/112.1 |
| 2003/0230625 A1 | 12/2003 | Aota et al. | |
| 2004/0000576 A1 | 1/2004 | Litwinski | |
| 2006/0191978 A1 * | 8/2006 | Barnes | 228/112.1 |

FOREIGN PATENT DOCUMENTS

EP    1 057 572 A2    12/2000

OTHER PUBLICATIONS

D. L. Hollar, Jr.; Resistance Seam Welding of Thin Copper Foils; Welding Journal; pp. 37-40, Jun. 1993.

Elmer, J.W., Kautz, D.D., *Fundamentals of Friction Welding*, Library of Congress Cataloging-in-Publication Data; ASM Handbook, vol. 6, p. 150, 1993.

The Welding Institute; *Thermomechanical material processing by friction*; Connect; Jul./Aug. 1996.

* cited by examiner

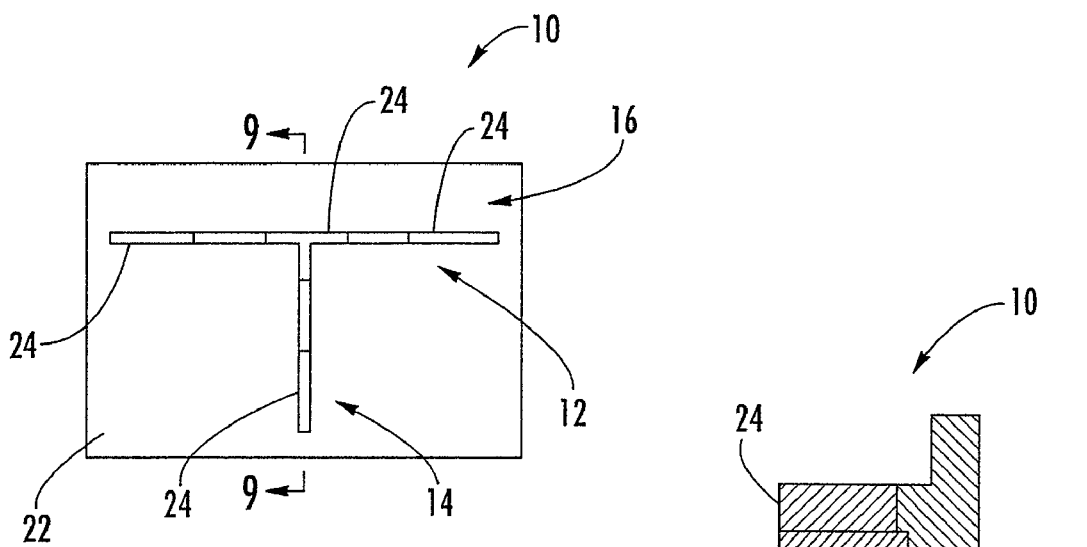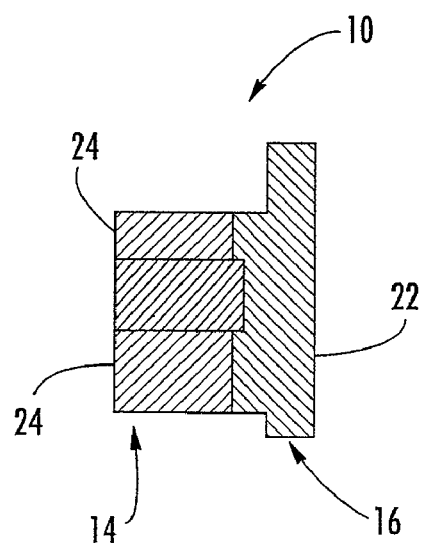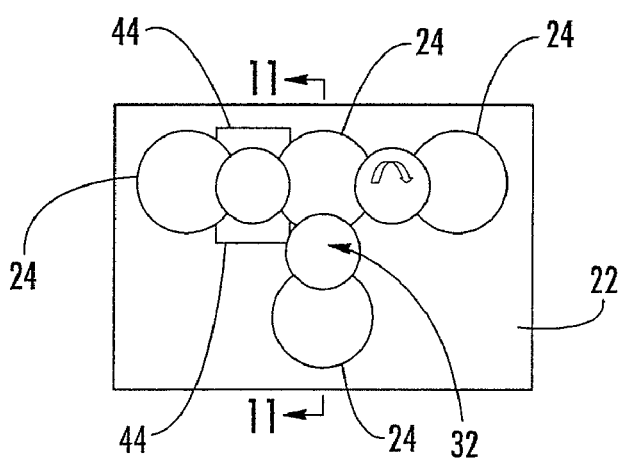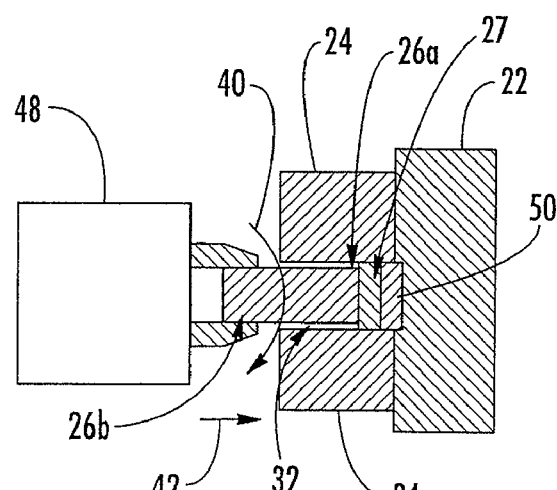

METHOD FOR FORMING A PREFORM FOR A STRUCTURAL ASSEMBLY

CROSS-REFERENCE TO RELATED APPLICATION

This application is a divisional of U.S. patent application Ser. No. 10/737,873, filed Dec. 16, 2003, now U.S. Pat. No. 7,398,911, which is hereby incorporated herein in its entirety by reference.

FIELD OF THE INVENTION

This invention relates to friction welding and, more specifically, to friction welding a plurality of structural members to form a preform or a structural assembly.

BACKGROUND OF THE INVENTION

Structural devices are often formed as assemblies of a number of smaller structural members. Such assembling of individual members may be necessary to form devices that are too large or too complicated to be formed by conventional manufacturing methods. For example, such factors as casting sizes, forging sizes, available plate and block sizes, and the like can limit the size and geometry of the structural members that can be manufactured. To form larger or more complex devices, the structural members are typically assembled by joining the individual structural members using a variety of known joining techniques including, for example, mechanical fastening or welding.

Joints formed by mechanical fasteners such as rivets, screws, and bolts typically require an overlap of the structural materials at the joint. The fasteners and the overlap of material result in an increase in weight of the joint and the structural assembly. The joint can also introduce areas of increased stress, for example, around holes drilled for receiving rivets. Alternatively, weld joints can be formed to join the structural members, sometimes requiring little or no overlap of material. However, the formation of conventional weld joints, such as by arc or electron beam welding, can result in undesirable dimensional changes in the structural members. Welding can also introduce porosity or other discontinuities into the structural members or otherwise cause unwanted changes to the material properties of the structural members.

Friction welding has also been proposed as an alternative to conventional welding methods for joining members. Friction welding is further described in U.S. Pat. No. 5,460,317 to Thomas, et al., the entire content of which is incorporated herein by reference. Linear friction welding, and rotational friction welding can be used to form strong joints without reducing the mechanical characteristics of the joined materials or causing significant dimensional changes. However, each of these conventional friction welding techniques is limited by the dimensions of the structural members and/or the joints to be formed. For example, conventional linear friction welding and rotational friction welding require one member to be moved, i.e., oscillated or rotated, and urged against the other member. Because of the difficulty of moving large structural members, it can be impossible or impractical to join some structural members by these techniques.

Thus, there exists a need for an improved method of joining structural members to form structural assemblies. Preferably, the method should enable the manufacture of preforms that approximate the desired dimensions and configuration of the structural assembly and therefore require little machining or other subsequent processing to form the structural assemblies. The method should be adaptable for joining large and/or complex structural members. Further, the method should not add significant weight to the structural assembly, and should minimize undesirable dimensional changes and undesirable changes to the material properties of the structural members.

SUMMARY OF THE INVENTION

The present invention provides a frictionally welded preform and method for forming a structural assembly. The method includes welding structural members to a base member and subsequently providing a connection material to join the structural members. The resulting preform can be formed with dimensions and a configuration that approximate the dimensions and configuration of the structural assembly. Thus, the structural assembly can be formed by joining multiple members that are generally smaller than the finished assembly. For example, the preform can be formed by a device that is configured to rotary friction weld or friction stir weld relatively small structural members, regardless of the size of the finished structural assembly. The assembly can be formed from the preform with a reduced amount of machining or other processing, thereby saving time, materials, and energy.

According to one embodiment of the present invention, the method includes joining at least two structural members to form a preform for a structural assembly having a predetermined configuration. The structural members are frictionally welded to a base member so that the structural members extend from the base member and define at least one space therebetween. For example, the structural members can be rotary friction welded or linear friction welded to the base member. A connection material is then frictionally welded in each space to join the structural members. The connection material can be hydro pillar welded, e.g., by rotating and urging a consumable connection member in one of the spaces and toward the base member so that the connection member is plasticized and deposited in the respective space. Alternatively, the connection member can be provided in a configuration that corresponds to the space and can be rotary friction welded to the base member and the structural members, or disposed in the space and friction stir welded to the base member and the adjacent structural members. In any case, a bore can first be drilled at each of the spaces to overlap the adjacent structural members and form the space to a generally circular cross-sectional shape. One or more retainer members can also be positioned adjacent the respective space to substantially retain the plasticized material during welding of the connection material. Each retainer member can include a liner layer directed toward the respective space. Subsequent to the welding of the connection material, the structural members, the connection material, and/or the base member can be machined to the predetermined shape of the structural assembly. Each of the structural members, the base member, and the connection material can be formed of materials including aluminum, aluminum alloys, titanium, titanium alloys, steel, nickel-based alloys, copper-based alloys, beryllium-based alloys, and the like.

The present invention also provides a preform for forming a structural assembly of a predetermined configuration. The preform includes a base member and a plurality of elongate structural members that are joined by friction weld joints to the base member. The structural members are configured to correspond to the predetermined configuration of the structural assembly. The sides of the structural members define spaces therebetween in which a connection material is disposed. The connection material is frictionally welded to the structural members adjacent each space so that the connection material in each space connects at least two of the structural members. The connection material can be structured as a plurality of connection members, each connection member having a generally circular cross-sectional shape. The structural members can be rotary or linear friction welded to the base member, and the connection material can be hydro pillar welded, friction stir welded, or rotary friction welded to the base member and/or the structural members. The base member, structural members, and connection material can be formed of materials such as aluminum, aluminum alloys, titanium, titanium alloys, steel, nickel-based alloys, copper-based alloys, and beryllium-based alloys.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein:

FIG. 8 is a plan view of the structural assembly formed from the preform of FIG. 7 according to one embodiment of the present invention;

FIG. 9 is a section view of the structural assembly of FIG. 8, as seen along line 9-9 of FIG. 8;

FIG. 10 is a plan view of the partially formed assembly of FIG. 3, shown with two connection members disposed in the spaces between the structural members according to another embodiment of the present invention;

FIG. 11 is a section view of the structural assembly of FIG. 10, as seen along line 11-11 of FIG. 10, with a third connection member disposed in another space of the assembly;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 7:
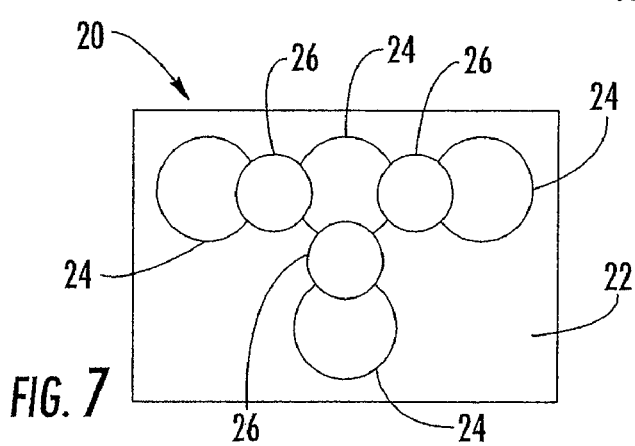
FIG. 7 is a plan view of a preform including the base member, structural members, and connection members of FIGS. 5 and 6.

Referring to the drawings and, in particular, to FIGS. 8 and 9, there is illustrated a structural assembly 10 according to one embodiment of the present invention. The illustrated structural assembly 10 is a T-section flange, which includes a flange portion 12, a stiffener portion 14, and a web portion 16, each of which can be orthogonal to the other portions. The structural assemblies formed according to the present invention can be formed from preforms, i.e., assemblies of multiple structural members that approximate the desired finished shape of the structural assembly, and which can be machined or otherwise trimmed to the finished shape. For example, FIG. 7 illustrates a preform 20, i.e., a partially formed structural assembly 10 before being machined to the desired configuration illustrated in FIGS. 8 and 9.

Figure 1:
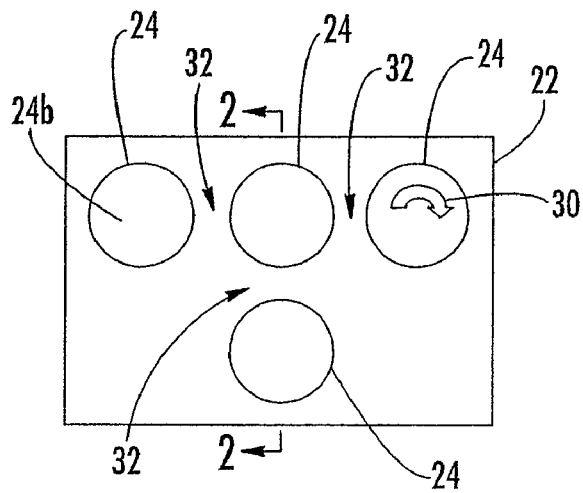
FIG. 1 is a plan view of a base member and structural members connected thereto during formation of a structural assembly according to one embodiment of the present invention.

The structural assemblies 10 of the present invention can be formed from any number of structural members depending on the desired dimensions and configuration of the structural assembly 10. Further, the configuration and material composition of the structural members can be formed and selected according to the specifications and design requirements of the structural assembly 10. As illustrated in FIG. 1 and 8, the web portion 16 of the assembly is formed from a base member 22, and the flange and stiffener portions 12, 14 are formed in part from structural members 24 that are connected to the base member 22. The base member 22 illustrated in FIG. 1 is a generally planar member and each of the structural members 24 extending therefrom is generally cylindrical. In other embodiments of the invention, however, the structural members 24 can define other configurations, including irregular geometric configurations. Similarly, the base member 22 can also be formed of non-planar members. Advantageously, each of the base member 22 and the structural members 24 can be standard stock members or stock members that have been modified. For example, each of the structural members 24 and the base member 22 can be formed of blocks having rectangular or square cross-sections, tubes and cylinders having circular or oval cross-sections, plates, angles or channels having a variety of cross-sectional shapes, or the like. As is known in the art, the structural members 22 can be formed from a variety of fabricating processes including milling, casting, die or hand forging, extruding, rolling, and machining. The base and structural members 22, 24 can be formed from materials having high strength to weight ratios and good corrosion resistance. For purposes of example only and not limitation, the structural assembly 10 can comprise aluminum, aluminum alloys, titanium, titanium alloys, steel, nickel-based alloys, copper-based alloys, beryllium-based alloys, or mixtures thereof. Further, the base member 22 and structural members 24 can be formed from similar or dissimilar materials.

In addition to the material composition and properties of the structural members 24, the selection of the structural members 24 is also based on the desired dimensions of the structural assembly 10 that is to be formed. More specifically, the desired dimensions of the structural assembly 10 can be determined first and the structural members 24 can then be selected so that the resulting preform 20 will closely approximate the predetermined dimensions and configuration of the finished assembly 10. Advantageously, by constructing preforms 20 having dimensions and configurations closely or substantially approximating the predetermined dimensions and configuration of the corresponding structural assembly 10, machining time and material waste can be minimized, making the assemblies 10 more economical to produce. The selection of materials and the subsequent formation of preforms and structural assemblies therefrom are described in U.S. application Ser. No. 10/092,675, titled "Preforms for Forming Machined Structural Assemblies," filed Mar. 7, 2002, which is assigned to the assignee of the present invention, and the entirety of which is incorporated herein by reference.

The structural assemblies 10 of the present invention can be used as structural components of a vehicle, such as an aircraft, automobile, or marine craft. For example, the structural members 10 can be panels, spars, beams, or other components that are joined to form a wing, wing support structure, fuselage, and the like of an airplane. Alternatively, the assemblies 10 can be used in buildings, machinery, and the like.

Generally, the structural assembly 10 is formed by connecting the structural members 24 to the base member 22 and disposing a connection material, e.g., a connection member 26, between the structural members 24. Subsequently, the base member 22, structural members 24, and the connection material can be machined or otherwise trimmed or processed to the dimensions of the structural assembly 10.

Figure 2:
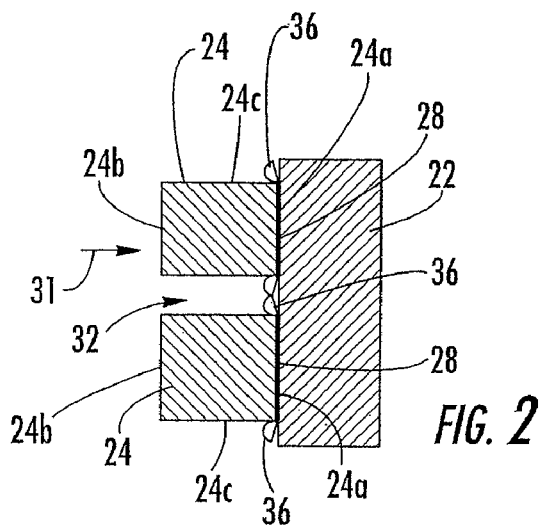
FIG. 2 is a section view of the partially formed assembly of FIG. 1, as seen along line 2-2 of FIG. 1.

The structural members 24 are connected to the base member 22 by welding and, in particular, the structural members 24 are preferably friction welded to the base member 22. For example, as shown in FIGS. 1 and 2, the structural members 24 are cylindrical in shape and define first and second ends 24a, 24b with a cylindrical side 24c extending therebetween. The first side 24a of each structural member 24 is connected to the base member 22 by a frictional weld joint 28 so that the structural members 24 extend generally parallel from the base member 22. More particularly, the structural members 24 can be rotary frictional welded to the base member 22 by rotating each structural member 24 in a direction 30 and urging the structural member in a longitudinal direction 31 toward the base member 22. The structural members 24 can be rotated, e.g., by a rotary actuator (not shown) such as an electric, hydraulic, or pneumatic actuator that is engaged to each structural member 24 by jaws, a chuck, or another connection device. The rotary actuator can be a conventional device that is otherwise used for rotary friction welding or friction stir welding. The relative rotational motion between the structural members 24 and the base member 22 generates frictional heating that plasticizes a portion of the structural member 24 and/or the base member 22. Once sufficient plasticization has occurred, the rotational motion of the structural member 24 is terminated. Plasticization can be detected, for example, by mechanical or optical measurements, or friction welding can be continued for a predetermined duration based on such factors as the type of materials being joined, the size or type of the joint to be formed, and the compressive force therebetween. After the motion of the structural member 24 is terminated, a compressive force between the structural member 24 and the base member 22 can be maintained by continuing to urge the structural member 24 in the direction 31 as the structural member 24 and the base member 22 cool to thereby form a friction weld joint 28 between the structural member 24 and the base member 22.

Figure 1A:
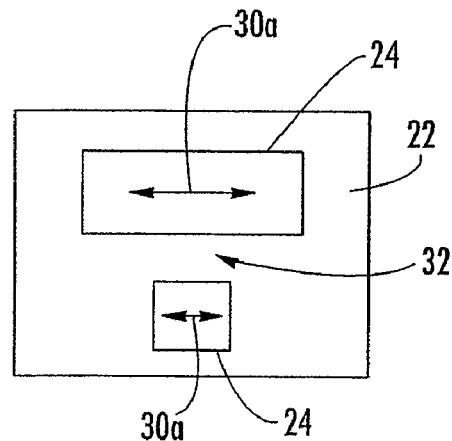
FIG. 1A is a plan view of the base member and structural members connected by linear friction welding according to another embodiment of the present invention.

Alternatively, the structural members 24 can have other configurations and can be connected to the base member 22 by other frictional welding techniques. For example, each of the structural members 24 can be a rectangular block as illustrated in FIG. 1A, and the structural members 24 can be linearly friction welded to the base member 22 by moving the structural members 24 in a reciprocating linear motion indicated by directions 30a and urging the structural members 24 in the direction 31 against the base member 22 to form a plasticized portion of the structural members 24 and/or the base member 22. Once plasticization has occurred, the structural members 24 can be held against the base member 22 until the plasticized material hardens, as described above. Thus, the frictional weld joints 28 between the structural members 24 and the base member 22 can be linear friction weld joints. Preforms with linear friction weld joints and methods therefor are described in U.S. application Ser. No. 10/738,594, entitled "Structural Assemblies and Preforms therefor Formed by Linear Friction Welding," filed Dec. 16, 2003, now issued on Jun. 5, 2007 as U.S. Pat. No. 7,225,967, assigned to the assignee of the present application, and the contents of which is incorporated herein in its entirety by reference.

Figure 3:
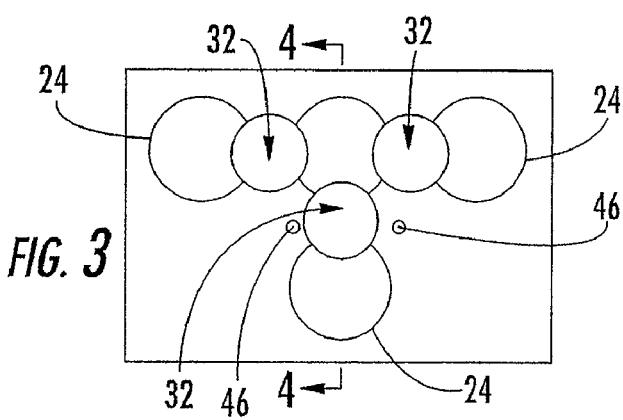
FIG. 3 is a plan view of the partially formed assembly of FIG. 1, shown with bored spaces between the structural members according to one embodiment of the present invention.
Figure 4:
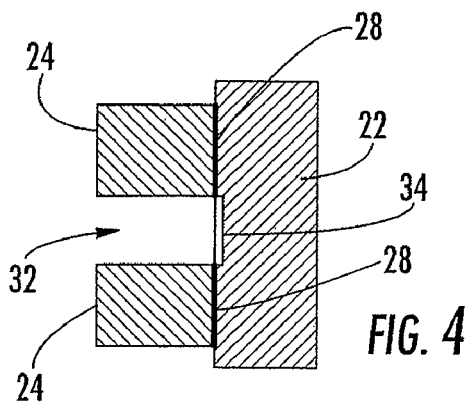
FIG. 4 is a section view of the partially formed assembly of FIG. 3, as seen along line 4-4 of FIG. 3.

The structural members 24 define spaces 32 therebetween for receiving the connection material. For example, referring again to FIG. 1, the structural members 24 are circular in cross-section and therefore each space 32 between the structural members 24 has a generally hourglass-shaped cross section. As illustrated in FIGS. 3 and 4, the shape of the spaces 32 can be changed, e.g., by drilling a bore between adjacent structural members 24 so that the spaces 32 have a circular cross-sectional shape. That is, a rotating drill (not shown) can be plunged between each adjacent pair of structural members 24 to form the spaces 32 to the desired shape, width, and length. In other embodiments, the spaces 32 can be rectangular, as illustrated in FIG. 1A, before being drilled to the desired shape, or the spaces 32 can be configured in the desired shape without drilling. Further, the spaces 32 can be drilled or otherwise extended into the base member 22, and the end 34 of the space 32 defined by the base member 22 can define various configurations so that the space 32 is cylindrical or so that the end 34 is tapered, rounded, frustoconical, or the like. Further, the entire space 32 can be cylindrical, tapered, or otherwise shaped. Thus, the space 32 can be configured to correspond to a shape of the connection members 26. In addition, flash 36 generated during connection of the structural members 24 to the base member 22 can be removed by machining or other conventional techniques.

Figure 5:
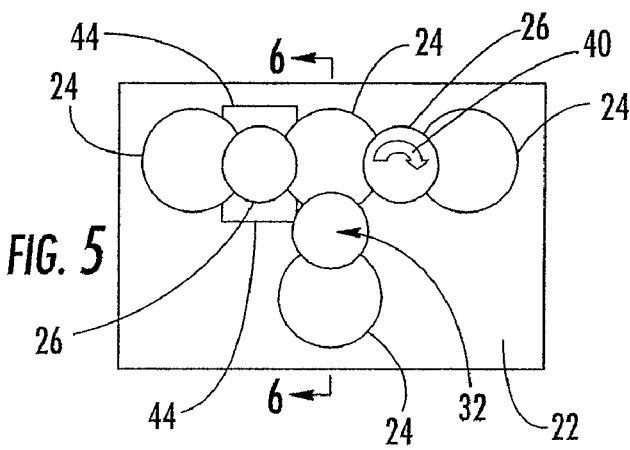
FIG. 5 is a plan view of the partially formed assembly of FIG. 3, shown with two connection members disposed in the spaces between the structural members according to one embodiment of the present invention.
Figure 6:
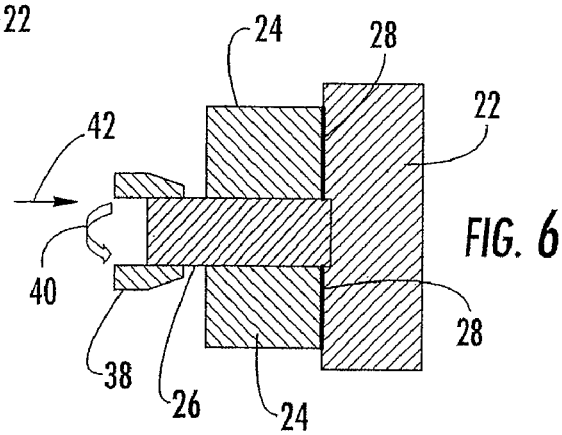
FIG. 6 is a section view of the partially formed assembly of FIG. 5, as seen along line 6-6 of FIG. 5, with a third connection member partially disposed in another space of the assembly.

The connection material is disposed in the spaces 32 between the structural members 24 using the connection members 26, which can correspond to the dimensions and configuration of the spaces 32. For example, as shown in FIGS. 5 and 6, the connection members 26 can be generally cylindrical members that correspond to the cylindrical spaces 32. The connection members 26, which can be formed of the same or dissimilar material as the structural members 24 and the base member 22, can be frictionally welded to the structural members 24 and/or the base member 22. More particularly, the connection members 26 can be rotary friction welded to the structural members 24 and the base member 22 by rotating each connection member 26 and urging the connection member 26 longitudinally into the space 32 toward the base member 22 so that the connection member 26 frictionally contacts the base member 22 and the adjacent structural members 24, and a portion of the connection member 26, the structural members 24, and/or the base member 22 is frictionally plasticized. Similar to the rotary friction welding technique described in connection with FIGS. 1 and 2 for connecting the structural members 24 to the base member 22, the connection members 26 can be rotary friction welded by engaging the connection member 26 by jaws 38, which are connected to a rotary actuator (not shown). The jaws 38 rotate the connection member 26 in direction 40 and urge the connection member in direction 42 toward the base member 22. Retainer members 44 can be disposed to retain the plasticized material and at least partially prevent the plasticized material from flowing from the space 32. For example, the retainer members 44 can be shaped to correspond to one of the connection members 26 and a portion of the adjacent structural members 24 and held in place by a support structure (not shown). Holes 46 (FIG. 3) or other features can also be provided in the base member 22, and the retainer members 44 can define corresponding posts or other features (not shown) that thereby engage the base member 22 to secure the retainer members 44 in place relative to the base member 22 during welding of the connection members 26.

After the last connection member 26 is installed, as illustrated in FIGS. 6 and 7, the partially formed structural assembly 10 comprises the preform 20, which preferably approximates the dimensions and configuration of the structural assembly 10 and which therefore can be machined or otherwise trimmed or processed to form the structural assembly 10. The preform 20 can be trimmed by any known means, including using a manual or computer-guided machining device, such as a computer numeric controlled (CNC) machine. During machining, portions of the base member 22, the structural members 24, and/or the connection material of the connection members 26 can be removed. Preferably, the preform 20 is trimmed according to predetermined dimensions corresponding to a desired configuration of the structural assembly 10, as shown in FIGS. 8 and 9. The preform 20 can also be subjected to thermal or mechanical treatments, before or after trimming. For example, the preform 20 can be subjected to heat treatments, quenching, bending, stretch forming, and the like.

In the embodiment illustrated in FIGS. 5 and 6, the connection material is disposed as structural connection members 26 that are partially plasticized during friction welding. That is, the structural connection members 26 frictionally contact the structural members 24 and/or the base member 22 and material from some or all of the members 22, 24, 26 is plasticized, but the structural connection members 26 do not undergo bulk plasticization. In other embodiments of the present invention, however, the connection material can be disposed in the spaces 32 by hydro pillar welding. Hydro pillar welding is a type of friction welding that is similar to the conventional hydro pillar processing technique in which a consumable rod is rotated and urged axially into a cavity of a workpiece so that frictional forces on the rod incrementally plasticize the rod along its length and create nearly hydrostatic conditions under which the plasticized material is urged axially and radially to fill the cavity. For example, as illustrated in FIG. 10, the spaces 32 between the structural members 24 can be prepared as described above in connection with FIGS. 3 and 4, and the connection material can be subsequently disposed in the spaces 32 by hydro pillar welding.

Hydro pillar welding generally includes successively plasticizing the entire working portion of the connection member 26 such that the connection member 26 is "consumed" during welding. More particularly, each of the consumable connection members 26 is rotated and urged into the respective space 32 against the base member 22. For example, as shown in FIG. 11, a grip portion 26b of the connection member 26 can be engaged by the jaws 38 of actuator 48, which is configured to rotate the member 26 in direction 40 and urge the member 26 in the longitudinal direction 42 toward the base member 22. A leading edge 26a of the connection member 26 is plasticized by the frictional heat that develops to form a region 27 of plasticized material that is squeezed radially outward against the structural members 26. Thus, the plasticized material of the connection member 26 is extruded from between the leading edge 26a of the connection member 26 and the base member 22 and forced radially outward to fill the space 32 between the structural members 26. As the plasticized material hardens, a weld joint 50 is formed in the space 32. For hydro pillar friction welding, the connection member 26 is typically smaller in diameter than the space 32 so that significant plasticization of the connection member 26 occurs only at the leading edge 26a of the member 26. As the connection member 26 is plasticized, the connection member 26 is reduced in length, i.e., consumed. Typically, connection member 26 is substantially plasticized during hydro pillar welding, i.e., the entire connection member 26 is consumed except for the grip portion 26b. During or subsequent to the plasticization of the member 26, the plasticized material cools and hardens to form the weld joint 50.

Figure 12:
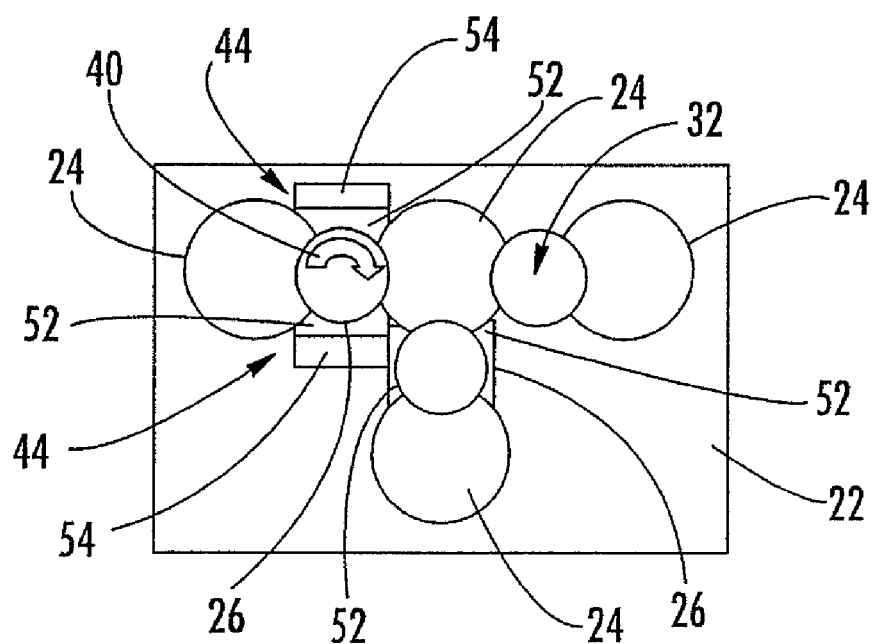
FIG. 12 is a plan view of the partially formed assembly of FIG. 3, shown with two connection members disposed in the spaces between the structural members and with retainer members provided according to one embodiment of the present invention.
Figure 13:
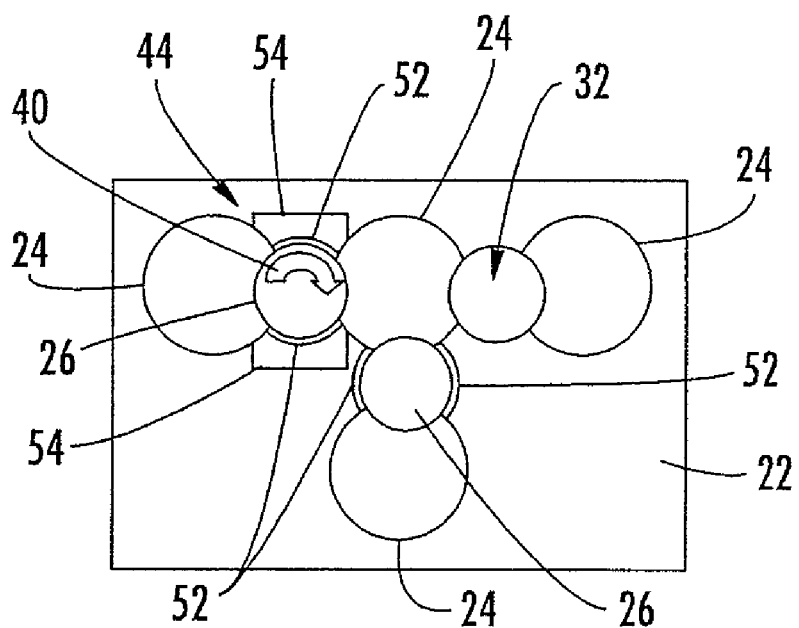
FIG. 13 is a plan view of the partially formed assembly of FIG. 3, shown with two connection members disposed in the spaces between the structural members and with retainer members with disposable linings provided according to another embodiment of the present invention.

The retainer members 44 can be provided during hydro pillar welding to retain the plasticized region 27 of material in the space 32 and substantially prevent the material from flowing radially outward from the space 32 between the structural members 26. The retainer members 44 that are used during rotary friction welding or hydro pillar welding of the connection members 26 can have various configurations. For example, as shown in FIG. 12, each retainer member 44 can include a contact portion 52 that is directed toward the connection member 26 and configured to contact the connection member 26 and/or the plasticized material during welding. Retainer members 44 are positioned opposite each space 32 and can be supported by backing clamps 54 that generally do not contact the plasticized material. Depending on the material of the retainer members 44 and the type of welds 50 being formed, the contact portion 52 of each retainer member 44 can be joined to the respective connection member 26 during welding or can be easily released therefrom after welding. For example, if the connection members 26 are formed of aluminum, and the retainer members 44 are formed of steel, friction welding of the connection members 26 can be achieved at a temperature that is high enough to plasticize the aluminum of the connection members 26 without plasticizing the steel of the retainer members 44. Thus, the joint 50 can be formed without joining the connection material to the retainer members 44. Alternatively, if the contact portion 52 of each retainer member 44 is formed of a material having a plasticizing temperature similar to the plasticizing temperature of the connection material, the contact portion 52 can be partially plasticized and welded to the preform 20. Thus, after the connection member 26 is welded, the contact portion 52 can be fixedly joined to the connection members 26, the structural members 24, or the base portion 22. The backing clamps 54, however, are preferably not joined thereto and can be easily removed, e.g., for re-use in supporting the contact portions 52 of other retaining members 44. The contact portion 52 can be provided as a relatively thin liner on the retainer member 44, as shown in FIG. 13, e.g., as a piece of sheet metal disposed on the backing clamp 54. In either case, the contact portion 52 of the retainer members 44 can be a disposable portion, which can be removed by machining during formation of the structural assembly 10.

Figure 14:
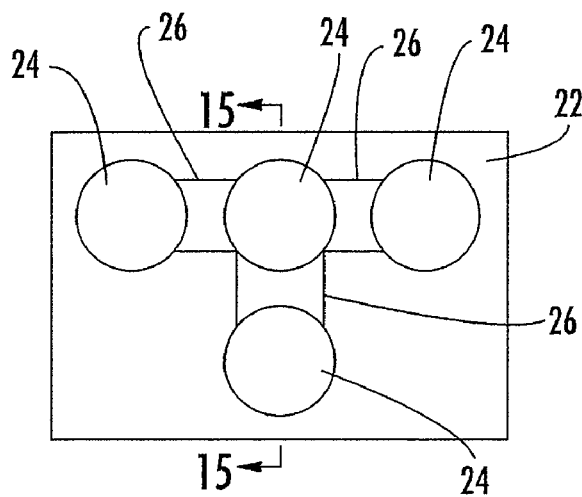
FIG. 14 is a plan view of the partially formed assembly of FIG. 1, shown with connection members disposed between the structural members according to another embodiment of the present invention.
Figure 15:
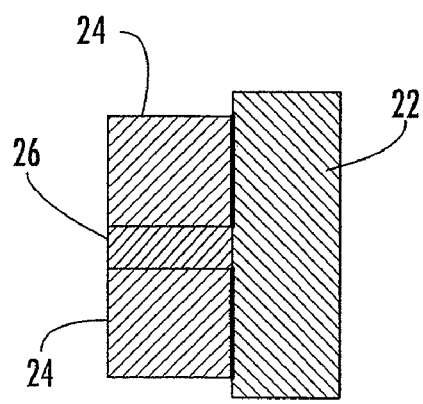
FIG. 15 is a section view of the partially formed assembly of FIG. 14, as seen along line 15-15 of FIG. 14.
Figure 16:
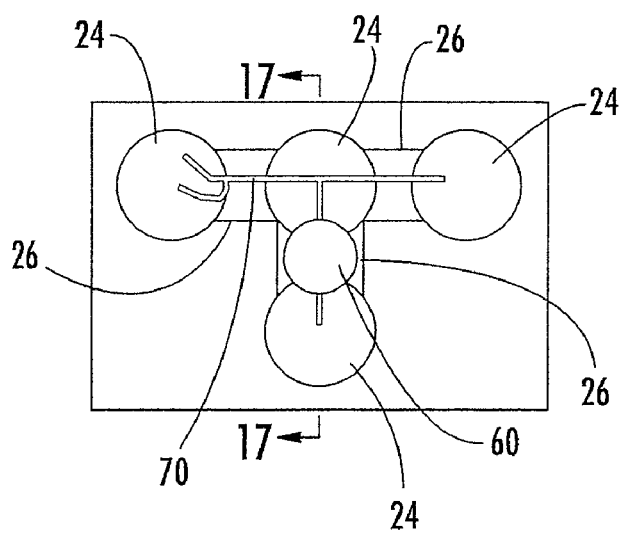
FIG. 16 is a plan view of the partially formed assembly of FIG. 14, shown with a friction stir welding device configured to form a friction stir weld joint through the structural members and the connection members according to yet another embodiment of the present invention.
Figure 17:
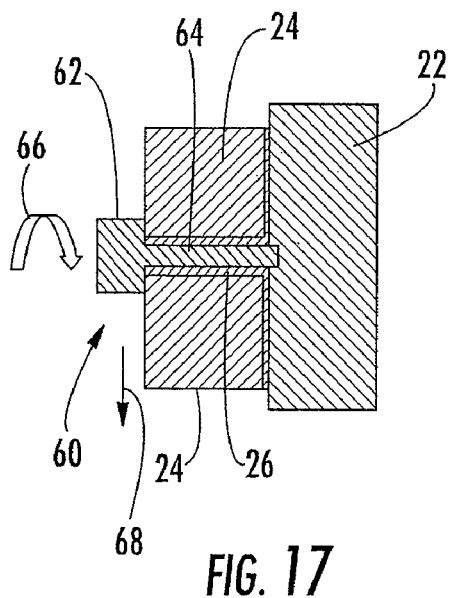
FIG. 17 is a section view of the partially formed assembly of FIG. 16, as seen along line 17-17 of FIG. 16.

In other embodiments of the present invention, the connection material can be disposed as structural connection members 26 that substantially correspond to the shape of the spaces 32, and the connection members 26 can be subsequently frictionally welded in place. For example, as shown in FIG. 14, each of the connection members 26 has an hourglass-like cross-sectional shape that corresponds to the spaces 32 between the structural members 24 described in connection with FIG. 1. The connection members 26 are disposed as shown in FIGS. 14 and 15 in the spaces 32. Subsequently, the connection members 26 are friction stir welded to the base member 22 and/or the structural members 24. For example, as shown in FIGS. 16 and 17, a friction stir welding tool 60 defining a shoulder 62 and a pin 64 extending therefrom is rotated in a direction 66, and the pin 64 is urged longitudinally, e.g., in a direction 68, along a path 70 extending through one or more of the connection members 26 and the structural members 24. The friction stir welding tool 60 generates friction with one or more of the members 22, 24, 26, thereby frictionally heating the members 22, 24, 26 and forming a plasticized region of the materials of the members 22, 24, 26. Friction stir welding is further described in U.S. Pat. No. 5,460,317 to Thomas, et al.

The connection members 26 used in the various embodiments of the present invention can be formed of a variety of materials, which can be similar or dissimilar to the materials of the structural members 24 and/or the base member 22. For example, the connection members 26 can be formed of aluminum, aluminum alloys, titanium, titanium alloys, steel, nickel-based alloys, copper-based alloys, beryllium-based alloys, or mixtures thereof, and can be formed by fabricating processes such as milling, casting, die or hand forging, extruding, rolling, or machining.

It is appreciated that the granular structure of one or more of the members 22, 24, 26 can be refined by the friction welding, including rotary friction welding, linear friction welding, hydro pillar friction welding, and friction stir welding. Thus, the welding of the various members 22, 24, 26 can enhance the material properties thereof, e.g., by increasing the strength, ductility, or corrosion resistance of one or more of the members 22, 24, 26. Further, the members 22, 24, 26 can be thermally or chemically treated before, during, or after formation of the structural assemblies 10. For example, the members 22, 24, 26 can be heat treated individually or in combination before being joined. Alternatively, or in addition, the preform 20 or structural assembly 10 formed from the members 22, 24, 26 can be exposed to processing to relieve stress or improve strength. Processing can include subjecting the preform 20 and/or structural assembly 10 to a predetermined heating schedule which can include annealing, quenching, aging, solution annealing, and the like as is known in the art.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a preform for a structural assembly having a predetermined configuration, the method comprising:

frictionally welding at least two structural members to a base member such that the structural members extend from the base member and the structural members define at least one space therebetween; and frictionally welding a connection material in the at least one space to join the at least two structural members such that the structural members and the base member form the preform having a configuration corresponding to the predetermined configuration of the structural assembly, wherein said second welding step comprises positioning a structural connection member comprising the connection material in each space and urging a rotating friction stir welding pin at least partially through each structural connection member to thereby friction stir weld each connection member to at least one of the base member and the structural members adjacent the connection member.

2. A method according to claim 1 wherein said first welding step comprises rotating the at least two structural members and urging the structural members against the base member such that the structural members are thereby rotary friction welded to the base member.

3. A method according to claim 1 wherein said first welding step comprises reciprocatingly moving the at least two structural members relative to the base member and urging the structural members against the base member such that the structural members are thereby linear friction welded to the base member.

4. A method of forming a preform for a structural assembly having a predetermined configuration, the method comprising:

frictionally welding at least two structural members to a base member such that the structural members extend from the base member and the structural members define at least one space therebetween; and frictionally welding a connection material in the at least one space to join the at least two structural members such that the structural members and the base member form the preform having a configuration corresponding to the predetermined configuration of the structural assembly, wherein said second welding step comprises concurrently rotating a consumable connection member and urging the connection member in a respective one of the spaces and toward the base member such that a working portion of the connection member is subsequently plasticized and deposited in the respective space to substantially fill the respective space with the connection material, thereby hydro pillar welding the structural members adjacent the respective space.

5. A method of forming a preform for a structural assembly having a predetermined configuration, the method comprising:

frictionally welding at least two structural members to a base member such that the structural members extend from the base member and the structural members define at least one space therebetween;

drilling a bore between and overlapping at least two adjacent structural members to thereby remove portions of each structural member that face the other structure member after said at least two adjacent structural members have been frictionally welded to the base member, thereby forming the space therebetween to a generally circular cross-sectional shape; and frictionally welding a connection material in the at least one space to join the at least two structural members such that the structural members and the base member form the preform having a configuration corresponding to the predetermined configuration of the structural assembly.

6. A method of forming a preform for a structural assembly having a predetermined configuration, the method comprising:

frictionally welding at least two structural members to a base member such that the structural members extend from the base member and the structural members define at least one space therebetween;

positioning at least one retainer member adjacent the respective space such that the at least one retainer member and the structural members adjacent the respective space substantially define a closed circumference of the space; and frictionally welding a connection material in the at least one space to join the at least two structural members such that the structural members and the base member form the preform having a configuration corresponding to the predetermined configuration of the structural assembly, wherein the at least one retainer and the structural members adjacent the respective space substantially retain plasticized material therein during said second welding step.

7. A method according to claim 6 further comprising providing a liner layer on the at least one retainer member and directing the liner layer toward the respective space during said second welding step.

8. A method according to claim 1 wherein said second welding step comprises rotating a structural connection member and urging the connection member into a respective one of the spaces such that the connection member frictionally engages respective structural members adjacent the respective space and the connection member is rotary friction welded to the base member and the respective structural members.

9. A method according to claim 1 wherein said first welding step comprises frictionally welding at least three structural members to the base member, the three structural members being configured to correspond to the predetermined configuration of the structural assembly and defining spaces therebetween, said second welding step comprising frictionally welding the structural connection material in the spaces to join the at least three structural members.

10. A method according to claim 1 wherein said first welding step comprises welding the at least two structural members to the base member such that the longitudinal axes of the structural members are configured in a substantially parallel configuration.

11. A method according to claim 1 further comprising providing the structural members, the base member, and the connection material, each of the structural members, the base member, and the connection material being formed of at least one of the group consisting of aluminum, aluminum alloys, titanium, titanium alloys, steel, nickel-based alloys, copper-based alloys, and beryllium-based alloys.

12. A method according to claim 1 further comprising machining the preform subsequent to said welding steps to form the structural assembly defining the predetermined configuration.

13. A method according to claim 12 wherein said machining step comprises machining a portion of the base member, the structural members, and the connection material.

* * * * *